US012498782B2

(12) United States Patent
Jagmag et al.

(10) Patent No.: US 12,498,782 B2
(45) Date of Patent: Dec. 16, 2025

(54) MACHINE-BASED CLASSIFICATION OF OBJECT MOTION AS HUMAN OR NON-HUMAN AS BASIS TO FACILITATE CONTROLLING WHETHER TO TRIGGER DEVICE ACTION

(71) Applicant: Roku, Inc., San Jose, CA (US)

(72) Inventors: Adil Jagmag, Hollis, NH (US); Sharada Palasamudram Ashok Kumar, Sunnyvale, CA (US); Philip Golyshko, Westminster, CO (US); Li-Cheng Tai, San Jose, CA (US); Jaime Martinez, Austin, TX (US)

(73) Assignee: Roku, Inc., San Jose, CA (US)

( * ) Notice: Subject to any disclaimer, the term of this patent is extended or adjusted under 35 U.S.C. 154(b) by 395 days.

(21) Appl. No.: 18/208,449

(22) Filed: Jun. 12, 2023

(65) Prior Publication Data
US 2024/0411358 A1 Dec. 12, 2024

(51) Int. Cl.
*G06F 3/01* (2006.01)
(52) U.S. Cl.
CPC .................................. *G06F 3/011* (2013.01)
(58) Field of Classification Search
None
See application file for complete search history.

(56) References Cited

U.S. PATENT DOCUMENTS

| | | | |
|---|---|---|---|
| 2008/0189661 A1* | 8/2008 | Gundlach | G06F 3/017 382/103 |
| 2009/0195704 A1* | 8/2009 | Bombara | H04N 21/43637 348/734 |
| 2014/0206428 A1* | 7/2014 | Thompson | G07F 17/3204 463/20 |
| 2017/0124410 A1* | 5/2017 | Cho | G06V 40/10 |
| 2019/0384409 A1* | 12/2019 | Omer | G01S 13/003 |
| 2021/0342020 A1* | 11/2021 | Jorasch | H04L 67/12 |

* cited by examiner

*Primary Examiner* — John W Miller
(74) *Attorney, Agent, or Firm* — McDonnell Boehnen Hulbert & Berghoff LLP

(57) ABSTRACT

A method and system for evaluation of object motion repetitiveness as a basis to distinguish between human motion and non-human motion, in order to facilitate control of device operation. An example method includes (i) a computing system receiving sensor data representing object motion detected by at least one sensor, the object motion defining motion of an object, (ii) the computing system making a determination, based at least on an evaluation of the received sensor data, of whether the detected object motion is repetitive, and (iii) based at least on the determination being that the detected object motion is not repetitive, the computing system responding to the detected object motion by causing a device to take an action corresponding with a prediction that the object is a human being.

20 Claims, 11 Drawing Sheets

MACHINE-BASED CLASSIFICATION OF OBJECT MOTION AS HUMAN OR NON-HUMAN AS BASIS TO FACILITATE CONTROLLING WHETHER TO TRIGGER DEVICE ACTION

SUMMARY

In various scenarios, it may be useful to cause a device to take action in response to detecting that a person has moved into an area near the device. By way of example, it may be useful to cause a television to turn on or to present certain media content when a person moves to a position in front of the television where the person is likely to watch the television. As another example, it may be useful to cause lights in a room to turn on when a person moves into the room.

To facilitate these or other such operations, a computing system could make use of one or more sensors (e.g., millimeter-wave radar sensors, lidar sensors, ultrasonic sensors, camera sensors, etc.) configured to detect object motion in an area near the device. For instance, one or more sensors may detect motion of an object in the area and may provide the computing system with a sensor data feed representing the detected object motion, such as data representing progression of the object through predefined spatial segments, defining path and speed of movement of the object. Based at least on the computing system determining that this sensor data represents sufficient object motion in the relevant area, the computing system may then programmatically conclude that a person is moving near the device, and the computing system may therefore responsively cause the device to take action.

Unfortunately, one technical problem that may arise in this process is that the detected object motion may actually be motion of a non-human object. For example, the detected object motion may be motion of a machine or apparatus, such as a robot vacuum cleaner, a table fan, a ceiling fan, or window treatment such as blinds or shades, or may be motion of a pet, such as a cat or dog, among other possibilities.

If the computing system responds to such non-human motion by causing a device to take action, the result may be a waste of resources and/or generally undesirable. For instance, causing a television to turn on in response to detecting nearby non-human motion such as motion of a robot vacuum cleaner or pet may be a waste of power and may provide poor user experience for humans who are located in earshot of the television and hear the television being unexpectedly turned on. Likewise, causing lights in a room to turn on in response to detecting non-human motion such as motion of a robot vacuum cleaner or pet may similarly be a waste of power and/or may pose other issues.

One approach to help address this problem may be to implement more sophisticated sensors and/or a greater number of sensors, configured in a manner to help facilitate distinguishing between human motion and non-human motion. Unfortunately, however, that approach may be more costly and complex and may therefore be undesirable for some applications.

A preferred approach as presently contemplated is for the computing system to engage in more intelligent processing of sensor data that represents detected object motion, possibly in conjunction with other data, in order to classify the detected object motion as being either human or non-human, and to operate accordingly. In particular, the computing system may programmatically take into account one or more object-motion attributes that tend to distinguish human motion from non-human motion. Based on consideration of one or more such object-motion attributes, the computing system may thereby determine whether or not to cause a device to take an action that corresponds with a prediction that the detected object motion is human motion rather than non-human motion. Further, this approach may apply with or without the use of more sophisticated sensors and/or an increased number of sensors.

In an example implementation, the computing system may be trained based on past experience, or otherwise configured, to treat certain object motion near the device as a basis to trigger action by the device, and the computing system may be further configured to use its human versus non-human classification of object motion as a basis to control whether to engage in that treatment.

For instance, by evaluating past instances of object motion in front of a television, in correlation with timing of when the television gets turned on (e.g., by remote-control input), the computing system may learn that the television often gets turned on upon detected object motion in front of the television stopping at or around a particular position (which may be a position of a couch or chair in front of the television to which a person tends to move and then set when then turning on the television). Based on that training, the computing system may thus configure itself to detect when object motion in front of the television stops at or around that particular position and to respond to that detected motion by automatically turning on the television—as a possible convenience for a person who moved to that position and may want to watch television. However, if, based on its consideration of one or more object-motion attributes, the computing system classifies the detected object motion as more likely non-human, then the computing system may disregard the detected object motion (e.g., abandon tracking of the object motion) and therefore not treat it as a basis to trigger turning on of the television.

Likewise, by evaluating past instances of object motion in a room in correlation with timing of when a light in the room gets turned on (or off, for that matter) (e.g., by use of a wall-based or remote control light switch), the computing system may learn that the light often gets turned on upon detected object motion stopping at or around a particular position. Based on that training, the computing system may thus configure itself to detect when object motion in the room stops at or around that position and to respond by automatically turning on the light in the room—as a possible convenience for a person who moved to that position and may want to turn on the light. However, if, based on the its consideration of one or more object-motion attributes, the computing system classifies the detected object motion as more likely non-human, then the computing system may disregard the detected object motion and therefore not treat it as a basis to trigger turning on the light.

The computing system may consider various object-motion attributes as a basis to classify detected object motion as either human or rather non-human or more generally to determine whether detected object motion is of a type that should be a basis to triggering device action corresponding with a prediction that the object at issue is a human (or to determine whether the detected object motion is more likely a type that should not be a basis for such triggering).

One example object-motion attribute that can help to distinguish human motion from non-human motion (such as motion of a robot vacuum cleaner, fan, or window treatment) is the level of repetitiveness of the object motion. For instance, the path and speed of movement of an automated machine such as a robot vacuum cleaner may be highly repetitive, e.g., having a statistical tendency to be the same each time, whereas the path and speed of movement of a human being is more likely to be non-repetitive, e.g., having a statistical tendency to be different each time.

Considering this factor, when the computing system receives sensor data representing detected object motion, the computing system could determine based on an evaluation of the sensor data whether the detected object motion is repetitive—e.g., whether the path and speed of the detected object motion is a repetition of previously detected object motion or is currently repeating. If the computing system thereby determines that the detected object motion is not repetitive, then, based at least on that determination, the computing system may respond to the detected object motion by causing a device to take an action that corresponds with a prediction that the object at issue is a human. Whereas, if the computing system thereby determines that the detected object motion is repetitive, then, based at least on that determination, the computing system may forgo so responding to the detected object motion; for instance, the computing system may disregard the detected object motion and not treat it as a basis for triggering device action.

Other example object-motion attributes that can help to distinguish human motion from non-human motion include the levels of speed and acceleration of the object motion and the extent to which the object motion is erratic (e.g., quickly changing directions of movement, etc.) For instance, certain pets such as dogs and cats may tend to move more quickly than humans, may tend to accelerate more quickly than humans, and may tend to move more erratically than humans.

Considering these or other such factors, when the computing system receives sensor data representing detected object motion, the computing system could evaluate one or more of these attributes as a basis to classify the detected object motion as human or rather non-human. For instance, if the computing system thereby determines that the detected object motion does not have threshold high speed, does not have threshold high acceleration, and is not threshold highly erratic, then based at least on that determination, the computing system may respond to the detected object motion by causing a causing a device to take an action that corresponds with a prediction that the object at issue is a human. Whereas, if the computing system thereby determines that the detected object motion has threshold high speed and/or threshold high acceleration, and/or that the detected object motion is threshold highly erratic, then the computing system may forgo so responding to the detected object motion; for instance, the computing system may disregard the detected object motion and not treat it as a basis for triggering device action.

Yet another object-motion attribute that can help to distinguish human motion from non-human motion is whether the path of motion entered into a sensor field of view from outside of the sensor field of view or rather appeared suddenly within the sensor field of view, i.e., if the detected motion started within the sensor field of view. Certain machine movements such as fan blade movements, or window curtains moving due to wind blowing or the like, may happen within a field of view of one or more sensors and would not include movement from outside the field of view to inside the field of view.

Considering this factor, when the computing system receives sensor data representing detected object motion, the computing system could determine based on an evaluation of the sensor data whether the detected path of object motion entered into the field of view from outside the field of view. If the computing system thereby determines that the detected path of object motion entered into the field of view from outside of the field of view, then, based at least on that determination, the computing system may respond to the detected object motion by causing a device to take an action that corresponds with a prediction that the object at issue is a human. Whereas, if the computing system thereby determines that the detected patent of object motion did not enter into the field of view from outside the field of view (e.g., that the object motion started suddenly within the field of view), then, based at least on that determination, the computing system may forgo so responding to the detected object motion; for instance, the computing system may disregard the detected object motion and not treat it as a basis for triggering device action.

The computing system may take into account other object-motion attributes as well, as a basis to control whether to treat detected object motion as a basis to trigger device action. Further, the computing system may take into account any of various combinations of these and/or other object-motion attributes as a basis to exert such control.

These and other as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
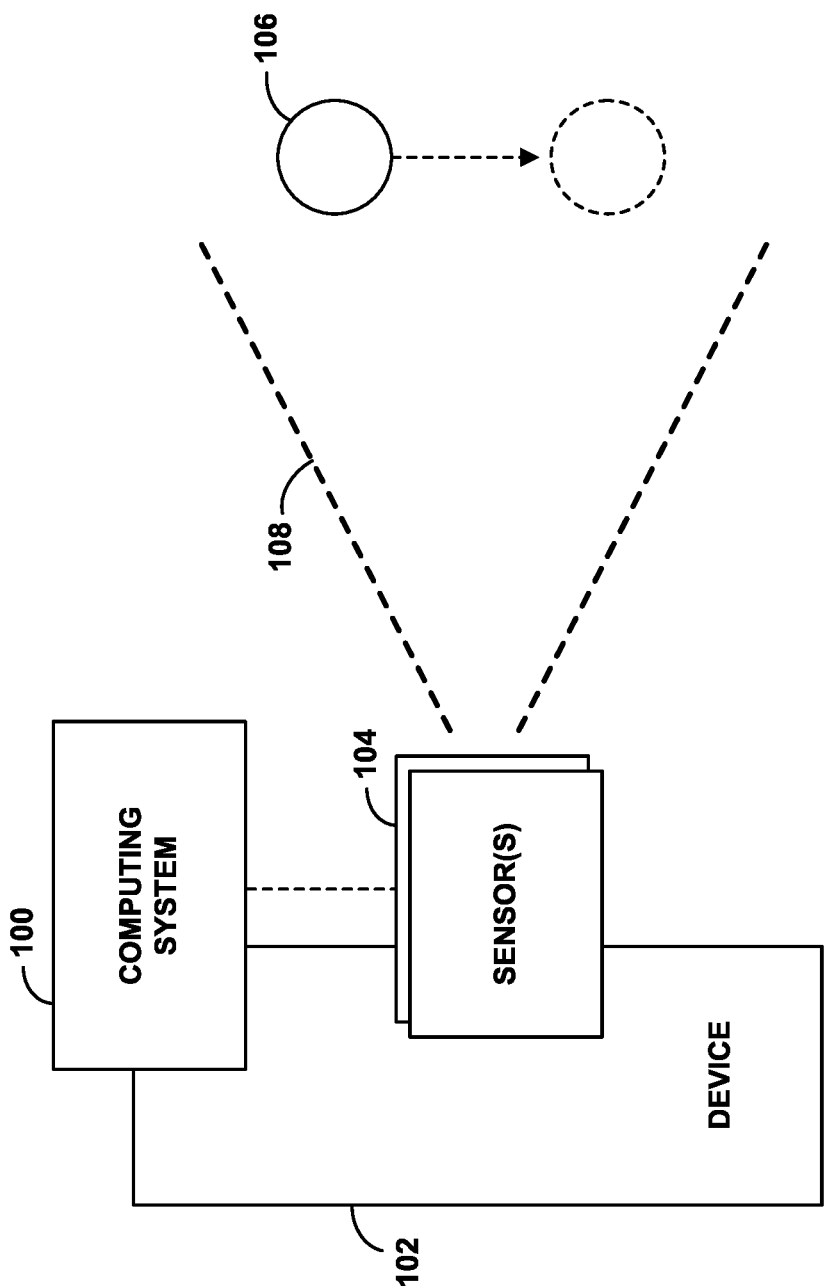
FIG. 1 is a simplified block diagram of an example arrangement in which a computing system could use one or more object-motion attributes as a basis to classify object motion as human or non-human, in order to facilitate control over triggering device action.

The present description will discuss an example implementation where the device at issue comprises a media-presentation device such as a television or media player, and where a computing system may process sensor data as a basis to classify detected object-motion as being human or rather non-human, so as to control whether to trigger action by the media-presentation device in the manner discussed above. It will be understood, however, that principles discussed herein could extend to apply as well with respect to controlling other types of devices and/or taking of other types of actions as well.

More generally, it will be understood that the arrangements and processes described herein could take various other forms. For instance, elements and operations could be re-ordered, distributed, replicated, combined, omitted, added, replaced, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units or other processors executing program instructions stored in memory or other data storage, among other possibilities.

Referring to the drawings, as noted above, FIG. 1 is a simplified block diagram of an example arrangement in which a computing system 100 could process sensor data as a basis to classify detected object motion as being either human or non-human, so as to facilitate controlling whether to trigger associated action by a device 102 (or by one or more devices).

In the example arrangement, the device 102 may be a television or other media-presentation device. Such a device 102 may be positioned at customer premises such as a home or office and may be manually controllable by use of a remote control (not shown) or other mechanism. For instance, a television may be positioned in a room of a home and may be manually controllable by a person operating a wireless handheld remote control paired with the television. Through use of such a remote control, the person might be able to turn on and off the television (e.g., wake the television from a low-power sleep state and put the television back into a low-power sleep state), change the channel, and otherwise control operations of the television.

The computing system 100 that will process sensor data as a basis to classify detected object motion as human or non-human so as to facilitate controlling whether to trigger action by the device 102 may be integrated in whole or in part with the device 102. For instance, the device 102 may have an internal computing system (e.g., a host processor and associated components) that generally controls various operations of the device, and that internal computing system could additionally be configured to carry out the presently disclosed operations of computing system 100, e.g., to process sensor data as a basis to classify detected object motion as human or non-human and to accordingly control whether to trigger action by the device 102.

Alternatively or additionally, the computing system 100 may be provided separate from the device 102. For instance, the computing system 100 could be provided in an adjunct device, such as an Internet of Things (IoT) switch, a streaming media receiver, or other device, set to engage in WIFI, Bluetooth, Zigbee, or other short-range wireless communication with the device 102.

In addition, the computing system 100 may include one or more client-side components and one or more network-side components. For instance, the computing system 100 may include one or more client-side components located at the same customer premises as the device 102 and may further include one or more cloud-based (e.g., internet-based) components in network communication with the client-side component(s). Some processing functions of the computing system 100 may therefore be carried out locally, while other processing functions of the computing system 100 may be carried out remotely. Other arrangements are possible as well.

Through its inclusion in and/or communication with the device 102, the computing system 100 could be configured to carry out various control operations with respect to the device 102. For instance, the computing system 100 may be configured to cause the device 102 to perform certain actions, by providing control signals to which the device 102 is configured to respond by performing those actions. Further, the computing system 100 may be configured to receive operational data regarding operation of the device 102 over time.

By way of example, if the device 102 comprises a television and/or associated media presentation device as discussed above, the computing system 100 may be configured to cause that television to power on or off and/or to present certain content (e.g., to tune to a particular channel). Further, the computing system 100 may be configured to receive and/or otherwise determine operational data such data regarding times when the television is powered on or off and/or data regarding content presented by the television (e.g., channels to which the television is tuned), among other possibilities.

Further, in some implementations, the computing system 100 may have control communication with one or more other associated devices or other entities. For instance, the computing system 100 may be in control communication with another device that is itself in communication with the device 102 at issue. By way of example, if the device 102 is a television that receives media content from a locally connected streaming media player, set top box, or other such device, the computing system 100 may be in control communication with that locally connected device, which may enable the computing system 100 to cause that device to feed certain content to the television and/or to receive operational data from that device. As another example if the device 102 is set to receive content from a cloud-based media provider system (e.g., a cable head end, a streaming media service provider, etc.) the computing system 100 may be in control communication with that media provider system, which may enable the computing system 100 to cause that media provider system to deliver certain content to the device 102.

As further shown in FIG. 1, the example arrangement includes one or more sensors 104. The one or more sensors 104 could take any of a variety of forms and may be configured to sense presence and relative position of an object 106, as well as possibly size and/or other properties of the object 106, as the object is present in and/or moves through physical space in a sensor field of view 108. Without limitation, examples of such sensors include millimeter wave (mmWave) radar sensors, lidar sensors, ultrasonic sensors, and camera sensors. In some implementations, the computing system 100 may also be integrated with one or more such sensors 104.

An example sensor might be configured to transmit pulses at various angles within the field of view and to receive reflections of those pulses, and the sensor and/or an associated computing system might be configured to use angle of arrival and time of arrival (e.g., round trip delay) of those reflections as a basis to develop a point cloud representing points within three-dimensional (3D) space in the field of view. With suitable calibration, this point cloud or other data based on such reflections or other sensor signals may establish the presence of an object at particular distance and angle from the sensor and may further establish a size and shape of the object, among other possibilities.

Some sensors may be more sophisticated than others. For instance, some sensors may have greater sensing resolution than others (possibly by having a greater number of antennas, if applicable), to facilitate development of point clouds with greater granularity and/or to otherwise more accurately and precisely establish the spatial position and other properties of an object. Further, some sensors may be able to sense object presence more quickly and frequently than others, which may help facilitate more granular sensing of motion of an object within the field of view. As noted above, however, more sophisticated sensors may be more expensive and complex, which may be undesirable for certain applications.

The example one or more sensors 104 may be integrated in whole or in part with the device 102. For instance, at least one sensor 104 could be included as a component of the device, to facilitate sensing object presence in physical space near or associated with the device. As to a television, for example, at least one sensor 104 might be provided in a screen bezel or elsewhere in the television and configured to sense object presence within a viewing area in front of the television. Alternatively or additionally, at least one sensor 104 could be provided separate from the device 102, possibly interconnected with the device 102, and positioned and configured to sense object presence near or associated with the device 102. Further, multiple sensors 104 might operate cooperatively to define a composite field of view.

As shown, the one or more sensors 104 could be in direct or indirect communication with the computing system 100. Based on the object sensing done by the one or more sensors 104, the one or more sensors 104 could thus provide the computing system 100 with a sensor data feed (e.g., one or more sensor data feeds) representing the detected physical position of an object over time and thereby representing detected motion of the object (i.e., detected object motion) and possibly other object data.

The sensor data feed provided to the computing system 100 could represent detected object position over time in various ways. Without limitation, for instance, the field of view of an example sensor could be divided into spatial segments, each spanning a respective angular range and a respective radial range. The granularity of this spatial division may depend on the sophistication of the sensor. Without limitation, for instance, the sensor may divide the field of view into angular segments each on the order of one to twenty degrees, and into radial segments each on the order of one to twenty centimeters. As an object moves through the field of view, the sensor data feed could thus specify the segment coordinates representing the progressive movement of the object from segment to segment in the field of view.

Figure 2:
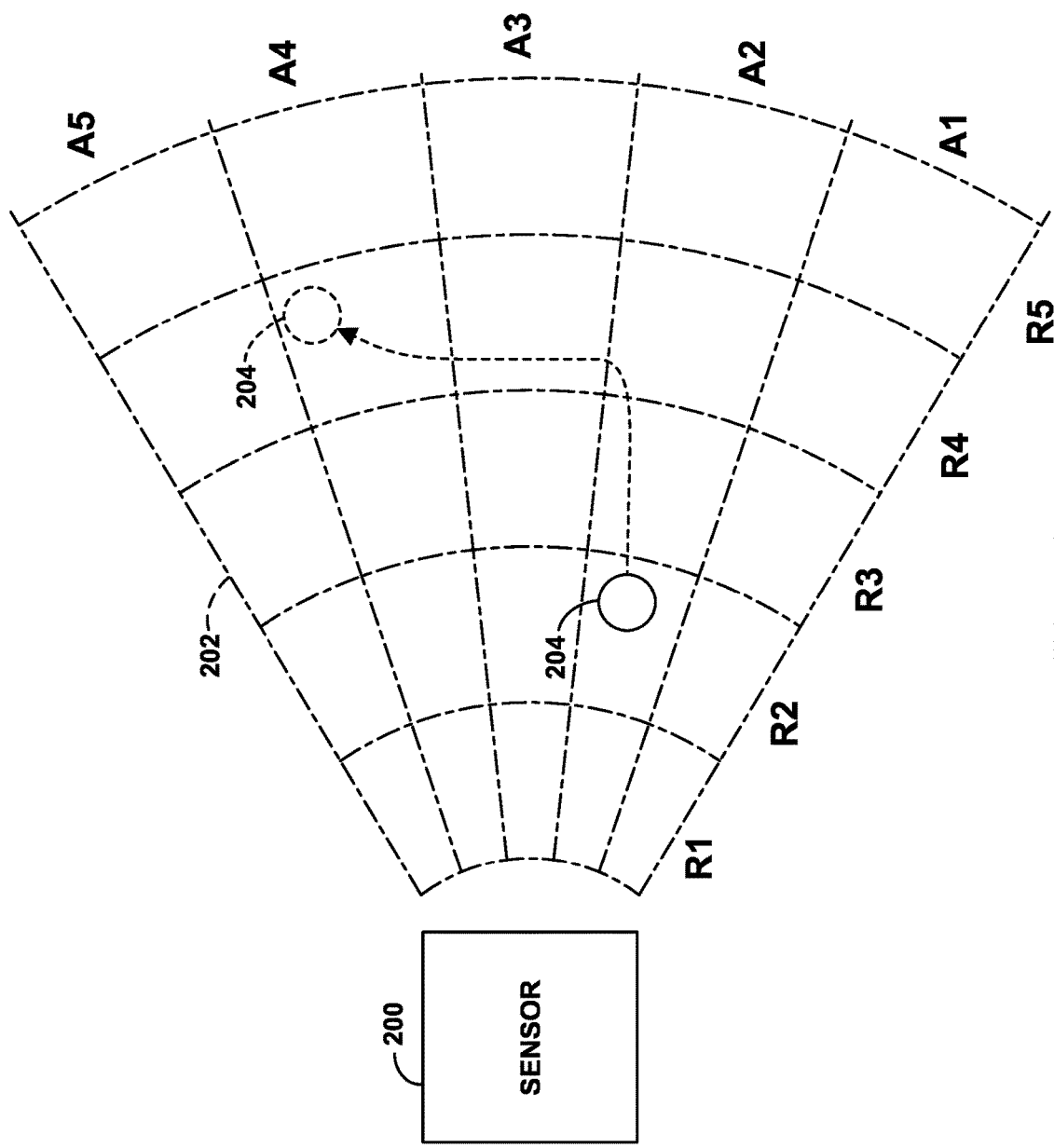
FIG. 2 is an illustration of an example sensor field of view divided into spatial segments, for tracking object motion.

FIG. 2 illustrates a simplified example of this, where an example sensor 200 is configured to sense and report object position over time within an example field of view 202. As shown, the example field of view 202 is divided into a polar grid of spatial segments. Namely, the field of view is divided into angular segments, shown as A1, A2, A3, A4, and A5, and radial segments, shown as R1, R2, R3, R4, and R5. With this arrangement, the sensor 200 could be configured to sense object presence on a per spatial-segment basis and to detect movement of an object from spatial segment to spatial segment. To facilitate this, for instance, the sensor 200 may engage in pulse transmission and reflection monitoring respectively in or through each of the angular segments and, within each angular segment, could use its determined distance of detected object presence as a basis to assign the detected object presence to particular ones of the radial ranges.

In practice, the granularity of these spatial segments may depend on sophistication of the sensor 200. Further, although the figure illustrates the field of view in just two dimensions, an example implementation could involve detecting object presence in three dimensions.

With this example arrangement, as an object 204 moves over time from spatial segment to spatial segment, the sensor 200 may provide the computing system 100 with a sensor data feed that indicates a sequence of spatial segments through which the object moves, thus effectively indicating detected object motion over time. For instance, with the example movement shown in the figure, the sensor data feed could indicate object motion along the path {[A2, R2], [A2, R3], [A2, R4], [A3, R4], [A4, R4]}. Further, the sensor 200 or the computing system 100 may timestamp this data, to facilitate determining speed and acceleration of the detected object motion, among other properties.

Figure 3:
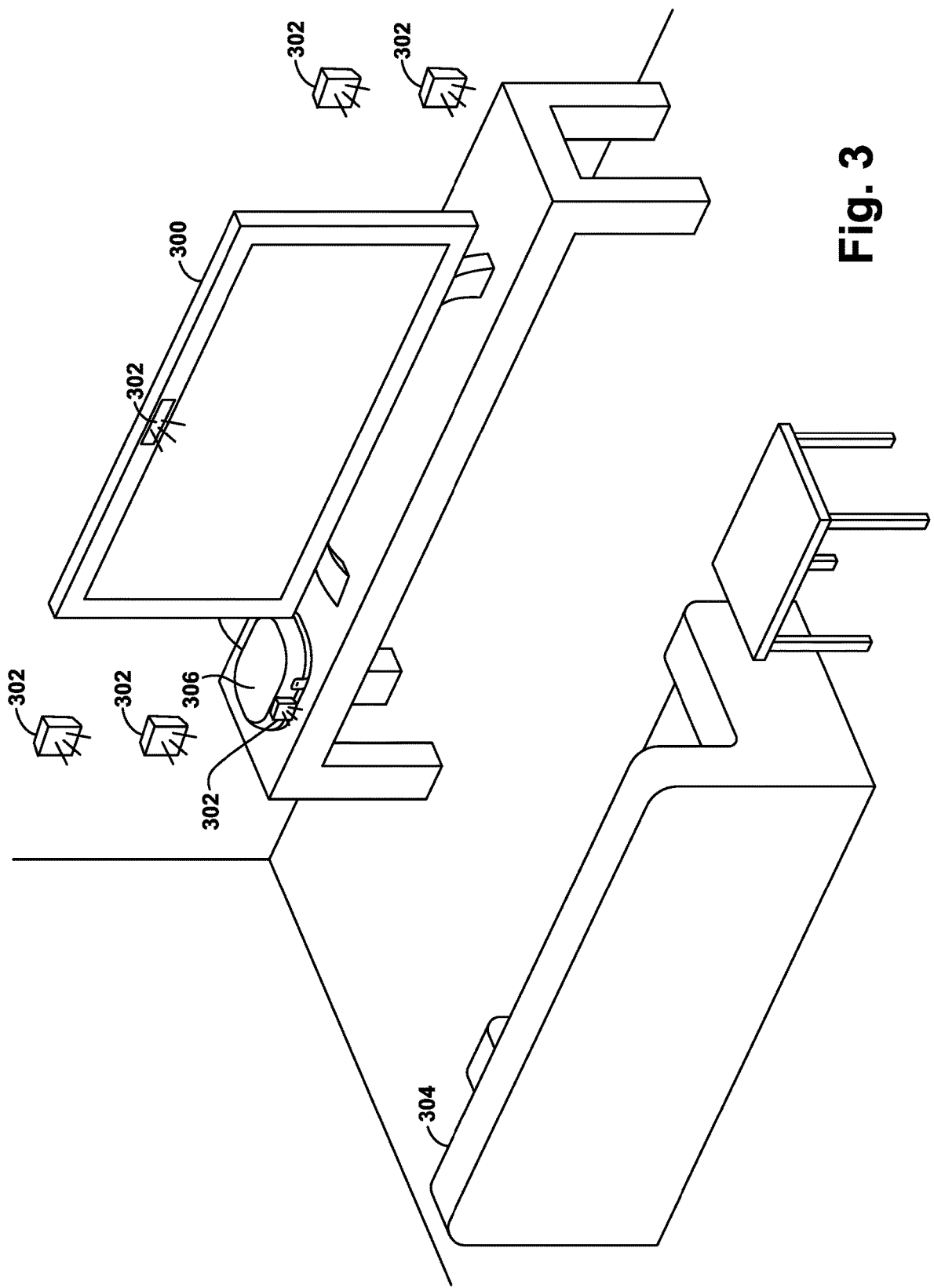
FIG. 3 is an illustration of an example scenario where it may be useful for a computing system to use one or more object-motion attributes as a basis to classify object motion as human or non-human, in order to facilitate control over triggering device action.

FIG. 3 illustrates an example scenario where a computing system 100 could use sensor data as a basis to classify detected object motion as human or rather non-human, in order to control whether to trigger device action. In particular, FIG. 3 illustrates a scenario where a television 300 is positioned within a room, and where one or more sensors 302 may sense object motion in a viewing area in front of the television and provide a sensor data feed to the computing system 100. Further, the figure shows an example couch 304 in front of the television 300, as a place where a person may sit to watch the television 300. In this example scenario, the computing system 100 may be integrated within the television 300 and is therefore not separately shown.

One or more example sensors 302 may be provided at any of various places in this scenario. For instance, the figure shows one example sensor 302 centered in a top bezel of the television, another example sensor 302 at a media player 306 (e.g., streaming media player and/or set top box) connected with the television 300, and other example sensors 302 mounted to a wall above or to the sides of the television 300. Any one or more of these or other sensors 302 may be in communication with the computing system 100 and may be configured to provide the computing system 100 with a sensor data feed as discussed above.

Figure 4:
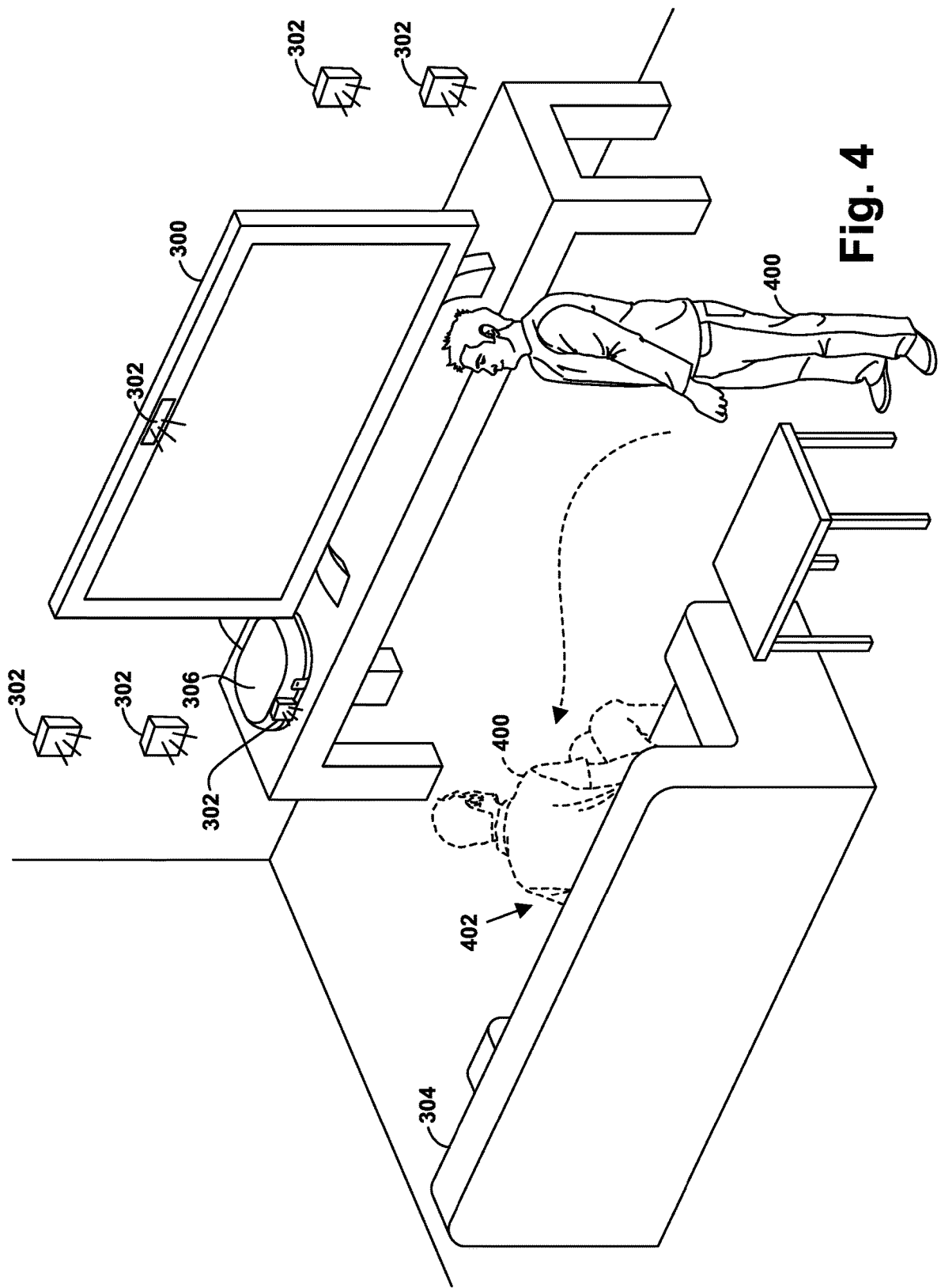
FIG. 4 is an illustration of the scenario of FIG. 3, where the object motion is motion of a person.
Figure 5:
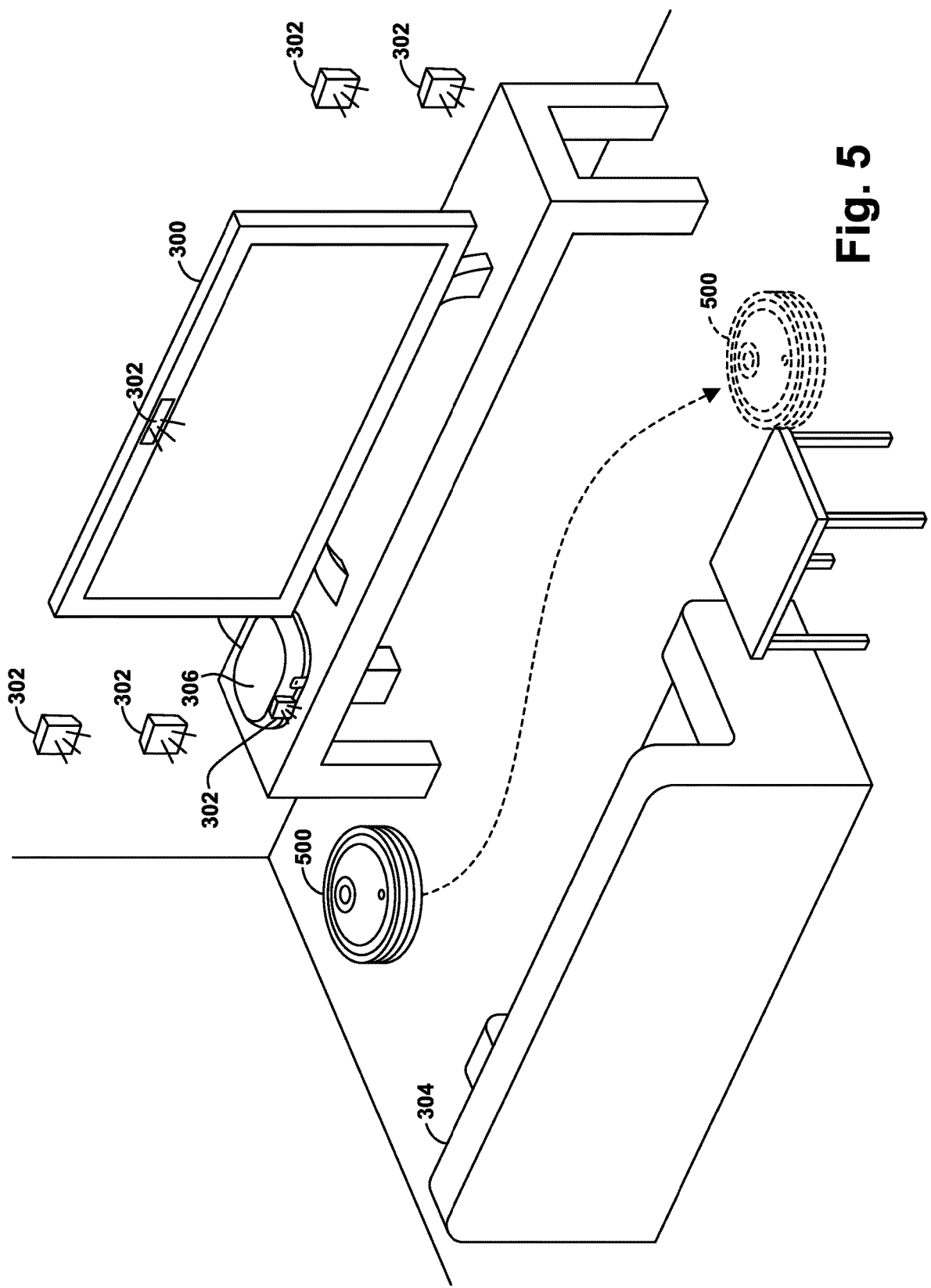
FIG. 5 is an illustration of the scenario of FIG. 3, where the object motion is motion of a robot vacuum cleaner.
Figure 6:
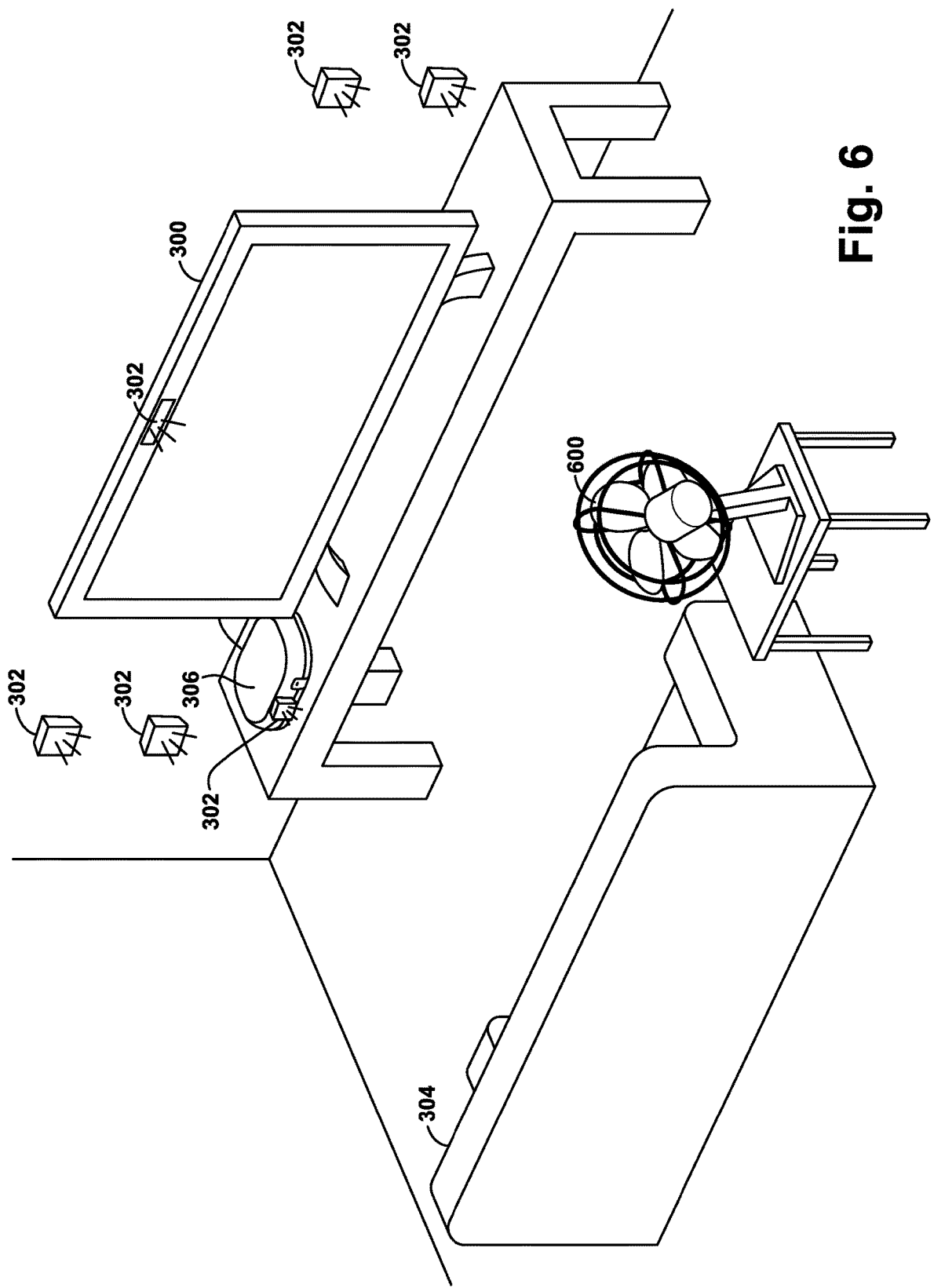
FIG. 6 is an illustration of the scenario of FIG. 3, where the object motion is motion of fan blades.
Figure 7:
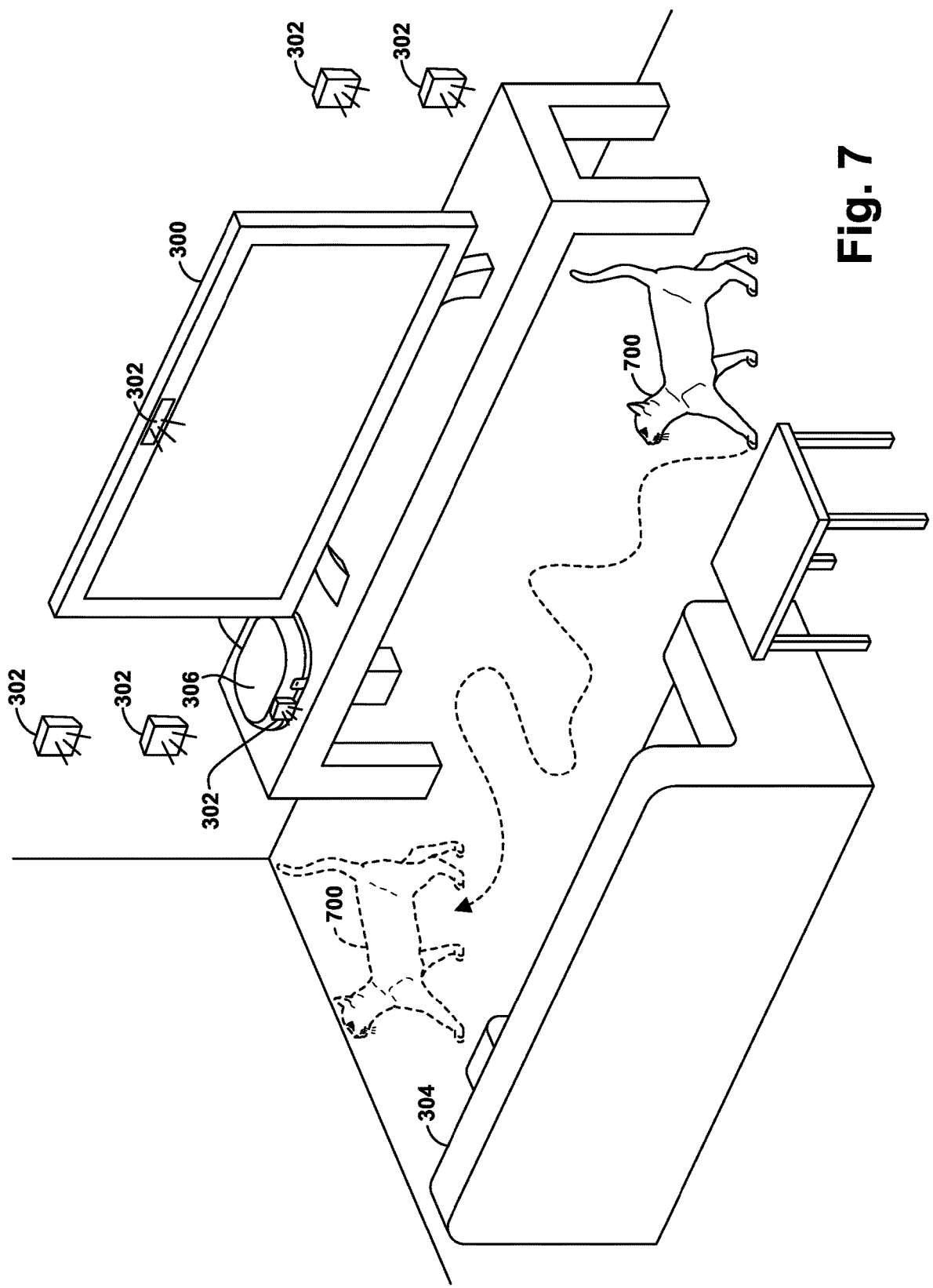
FIG. 7 is an illustration of the scenario of FIG. 3, where the object motion is motion of a pet.

FIGS. 4, 5, 6, and 7 next illustrate examples of object motion that may be detected by the one or more sensors 302 in this scenario and reported to the computing system 100 for analysis. Namely, FIG. 4 illustrates an example scenario where a person 400 moves through the space in front of the television 300 and may then arrive at a position that is on a seat of the couch 302 and sit there to watch the television 300. Whereas, FIG. 5 illustrates an example scenario where a robot vacuum cleaner 500 moves through the space in front of the television 300 to clean the floor, FIG. 6 illustrates an example scenario where a table fan positioned in the space in front of the television 300 has fan blades 600 that move rotationally, and FIG. 7 illustrates an example scenario where a pet 700 such as a cat moves through the space in front of the television 300.

In any of these example scenarios, one or more of the sensors 302 may detect object motion and report the detected object motion in real time to the computing system 100, to enable to computing system 100 (i) to classify the object motion as being or non-human and (ii) to accordingly exert real-time control over triggering device action. The computing system 100 may therefore receive this object motion data and may analyze it accordingly in order to carry out these or other classification and control operations. Further, the computing system may keep track of its analysis over time, possibly in correlation with other data, to facilitate improving its classification of the object motion and its control over triggering device action.

With the scenario illustrated by FIG. 4, the computing system 100 may receive sensor data that represents object motion along the path of movement of the person 400, ending with that motion stopping at (e.g., at or near) a position 402 that happens to be at the seat of the couch 304. Based on this sensor data, the computing system 100 may thus determine that the detected object motion stopped at that position 402. And based on this finding, the computing system 100 may respond to the detected object motion, including the stopping of the object motion at position 402, by causing the television 300 to power on. Optimally, the person 400 may thus perceive that, once the person 400 arrives at the seat of the couch 304, the television automatically turns on, conveniently enabling the person 400 to watch television.

To facilitate this process, by way of example, the computing system 100 may track instances of object motion over time in correlation with data indicating when the television 300 gets manually turned on. For instance, the computing system 100 may detect multiple instances in which detected object motion ends at (again, e.g., at or near) position 402, and the computing system 100 may determine that, in a statistically relevant number of those instances, the television 300 turned on shortly after the detected object motion stopped at that position 402. The computing system may thus programmatically observe a correlation between (i) detected object motion ending at position 402 and (ii) the television turning on. (This may correspond with a person normally moving to the seat of the couch 304 and then using a remote control to turn on the television 300.) Based on this or other such historical data, the computing system 100 may therefore determine that, when detected object motion ends at position 402, the computing system 100 should automatically cause the television 300 to turn on. And so the computing system 100 may do so.

Note also that, in addition to or instead of turning on the television 300 in response to detecting object motion that ends at a particular position, the computing system 100 may trigger one or more other device actions in response. By way of example, the computing system 100 may respond to the detected object motion by causing the television 300 to present certain content, such as predefined advertisement content or messaging for viewing by the person 400. For instance, this content may be stored locally at the television 300 or in an adjunct device such as a streaming media player or set top box, and the computing system 100 may engage in signaling that causes the television 300 or that adjunct device to provide the content for presentation by the television 300. Alternatively, the content may be stored in a network-based media-provider system, and the computing system 100 may engage in signaling that causes that system to deliver the content for presentation of the content by the television 300. (In addition, note that there may be numerous other scenarios where the computing system 100 may respond to detected object motion by triggering device action, not limited to finding that object motion ends at a position corresponding with a television 300 being turned on.)

An issue in this example scenario may be whether the computing system 100 is sufficiently confident that a human being is likely to interact with the device 102. Namely, at issue here may be whether the computing system 100 is sufficiently confident that a person is likely to want to watch the television 300.

One way for the computing system 100 to increase its level of this confidence is for the computing system 100 to train itself over time based on more and more observed data as noted above. Namely, based on multiple instances of object motion ending at about position 402, in correlation with the television 300 being powered on at about that same time, the computing system 100 may increase its confidence level for responding to such object motion by automatically turning on the television or causing the television to present particular content.

Furthermore, as discussed above, the computing system may take into account a number of object-motion attributes as a basis to distinguish between human and non-human motion, i.e., classifying the detected object motion as being either human or non-human, and the computing system may use that classification as a basis to control whether the computing system will trigger device action such as causing the television 300 to turn on and/or causing the television to present particular content. (In so classifying detected object motion, the computing system 100 need not designate or label the object motion expressly as "human" or "non-human." Instead, the computing system 100 may classify the detected object motion in a manner facilitates effectively controlling whether to trigger device action that would correspond with a prediction that the detected object motion is human rather than non-human.)

Without limitation, the computing system 100 could be programmed to use some of these object-motion attributes as a basis to determine that that the detected object motion is of a type that should effectively stop the computing system 100 from triggering the device action, e.g., by causing the computing system 100 to forgo triggering the device action based on the detected object motion. For instance, the computing system 100 might be tracking in-progress object motion through the space in front of the television 300, and that object motion might ultimately end at position 402 and cause the computing system 100 to therefore trigger causing the television 300 to turn on. But based on further evaluation of the detected object motion, the computing system 100 may classify the detected object motion as non-human, and, based on this classification, the computing system may therefore stop tracking that object motion, and/or the computing system 100 may forgo responding to the detected object motion by causing the television 300 to turn on.

Optimally, this use of one or more object-motion attributes could thus help to prevent causing the television 300 to turn on in scenarios where the detected object motion is unlikely to be human motion.

As indicated above, one example object-motion attribute that the computing system 100 could take into account is repetitiveness of the detected object motion, such as repetitiveness of the path of the object motion, possibly along with repetitiveness of the speed of the object motion. At issue here could be whether the computing system 100 has seen largely the same object motion at least a predefined threshold number of times in the past (e.g., a number in the range of two to twenty or more), and/or if the detected object motion is currently repeating.

The example scenarios shown in FIGS. 5 and 6 help to illustrate this.

As noted above, FIG. 5 illustrates a robot vacuum cleaner 500 moving through the space in front of the television 300, to clean the floor. Each time the robot vacuum cleaner 500 works to clean the floor in that area, the robot vacuum cleaner 500 may follow largely the same path of motion with largely the same speed of movement. Therefore, the computing system 100 may observe repeated instances over time of object motion following that path and with that speed.

Based on the computing system 100 thereby observing that this object motion path, and possibly speed, repeats at least a predetermined threshold number of times, the computing system 100 may then set itself to classify that particular object motion as an instance of repeated object motion and therefore likely non-human. Accordingly, each time the computing system 100 is tracking object motion and determines that the object motion is following that repeated object-motion path, possibly with the same speed, the computing system may respond to that detected repetitiveness by abandoning its tracking of that object motion and/or otherwise forging responding to the detected object motion by triggering device action.

As further noted above, FIG. 6 illustrates a table fan having fan blades 600 that move rotationally. When this fan is turned on, these blades would rotate repeatedly and periodically. Therefore, when the computing system 100 observes this object motion (here, motion of the fan blades 600), the computing system 100 may observe that the object motion is currently repeating and may accordingly classify the object motion as non-human or otherwise of a type that is likely not human. Further, the computing system 100 may likewise flag this object motion as repetitive based on the computing system's past observation of the same object motion, and the computing system 100 may further detect that this repetitiveness is periodic perhaps with a predefined threshold high frequency of repeating, and may use these considerations as well as a basis to classify the object motion as non-human or the like. Based on this object-motion classification, the computing system 100 may therefore abandon its tracking of this object motion and/or otherwise forgo responding to the object motion by triggering device action.

Note also that the computing system 100 may improve its training by observing that repetitive instances of object motion like these do not tend to result in turning on of the television 300. Namely, the computing system could observe an absence of a correlation between such object motion and the television 300 being manually turned on, and the computing system could use that observation to help improve the computing system's confidence that it should not trigger turning on of the television 300 in response to detecting that repeated object motion.

As indicated above, other example object-motion attributes that the computing system 100 could take into account as basis to classify object motion as human or non-human, so as to control whether to respond to the object motion by triggering device action include the levels of speed and acceleration of the object motion and the extent to which the object motion is erratic such as quickly changing directions or the like. The example scenario in FIG. 7 helps to illustrates this.

As noted, FIG. 7 illustrates a cat 700 moving through the space in front of the television 300. Often, cats may move erratically, quickly changing direction more randomly, and with quick acceleration and/or speed. Thus, when the computing system 100 observes this object motion (here, motion of the cat 700), the computing system 100 may observe that the object motion changes direction quickly and/or randomly, and/or that the object motion has a level of acceleration or speed greater than a predefined threshold that is more likely to indicate cat motion than human motion, and the computing system 100 may use one or more of these considerations as a basis to classify the object motion as non-human rather than human. Here too, then, based on this object-motion classification, the computing system 100 may therefore abandon its tracking of this object motion and/or otherwise forgo responding to the object motion by triggering device action.

The computing system 100 may take into account various combinations of these and/or other factors as well as a basis to help classify detected object motion as being either human or non-human, so as to control whether to trigger device action.

By way of example, the computing system may take into account the detected size of an object and slow speed of an object, and the repetitive nature of the object's motion. For instance, robot vacuum cleaners and other such non-human objects may be much smaller than human beings and to move more slowly than some human beings So if the computing system 100 determines that a detected object is at least as small as a predefined threshold and/or is moving at least as slow as a threshold slow speed, the computing system 100 may classify the object as non-human and may accordingly forgo responding to motion of the object by triggering device action. Thus, in an example implementation, the computing system 100 may classify detected object motion (e.g., motion of a robot vacuum cleaner) as non-human, and therefore avoid triggering device action in response to detecting the object motion, if the computing system finds that (i) the object is threshold small, (ii) the object moves threshold slowly, and (iii) the object moves in a repetitive and predictable pattern.

As another example, the computing system 100 may take into account the detected size of an object and fast speed of the object, and erratic nature of the object's motion, possibly along with where the object motion stops. For instance, pets are likely to be smaller than humans and, as noted above, to move more erratically and faster than humans. Further, a pet is likely to settle in a position such as on the floor in the middle of a room, in contrast to a human being more likely to settle on a couch or chair. Thus, if the computing system 100 determines that a detected object is threshold small, moves threshold quickly and suddenly, and stops moving at a particular position such as on the floor, the computing system 100 may classify detected object motion (e.g., motion of a pet) as non-human, and may therefore avoid triggering device action in response to detecting the object motion.

Further, as another example, the computing system 100 may take into account whether detected object motion appears suddenly within the sensor field of view or rather enters into the field of view from outside of the field of view. As noted above, for instance, certain non-human motion such as motion of fan blades or curtains blowing in the wind may start to occur within the sensor field of view without moving into the field of view from outside of the field of view. Whereas, human motion would more likely move into the field of view from outside of the field of view. Thus, if the computing system 100 determines that detected object motion starts within the field of view rather than moving into the field of view from outside of the field of view, the computing system 100 may classify that object motion as non-human and may therefore avoid triggering device action in response to detecting the object motion.

Still further, the computing system 100 may make use of environmental audio as a basis to help classify a detected object as human or rather non-human. For instance, a microphone in the television 300 or an associated remote control may receive environmental audio, and the computing system 100 may analyze that audio in relation to detected object motion to help determine if the object motion is human or rather non-human. By way of example, if the computing system 100 determines that the detected audio has properties of audio from a mechanical motor or of audio from a pet, as compared with audio from a small child or other human, the computing system 100 may use that determination as a basis to bolster its classification of the detected object motion as non-human, and therefore as a basis to forgo triggering device action in response to the detected object motion.

Yet further, the computing system 100 may take into account changes in lighting as a basis to help classify detected object motion as human or rather non-human. For instance, the computing system 100 may make use of an ambient-light-sensor in the television 300 or otherwise provided as a basis to detect when light in the room where the television 300 is position gets turned on or off. This may represent a situation where a person in the room has turned on or off the light, possibly moving to a switch to make that change. Thus, the computing system 100 may use this change in lighting as a basis to classify detected object motion as human, to increase its confidence in responding to the detected object motion by turning on the television or triggering other device action.

In addition, the computing system 100 may take into account information about objects that are likely to be present. For instance, based on IoT security camera monitoring even elsewhere in house, the computing system 100 may determine that a small child, robot vacuum cleaner, and/or pet is present in the house. The computing system 100 may then use that knowledge as a basis to help bias or bolster its classification of detected object motion. Likewise, the computing system 100 may use web browsing and/or shopping history data as basis to help bolster its classifications, such as by finding that a resident of the house buys children's toys or clothes and using that as a basis to conclude that detected object motion of a small size is more likely a child than a pet.

Still further, the computing system 100 may use Bluetooth or other wireless signal strength as a basis to classify whether detected object motion is human or rather non-human. For instance, a person's phone may broadcast a Bluetooth or other wireless signal, and the computing system 100 may detect this signal as a basis to determine that detected object motion is more likely human than non-human.

Figure 8:
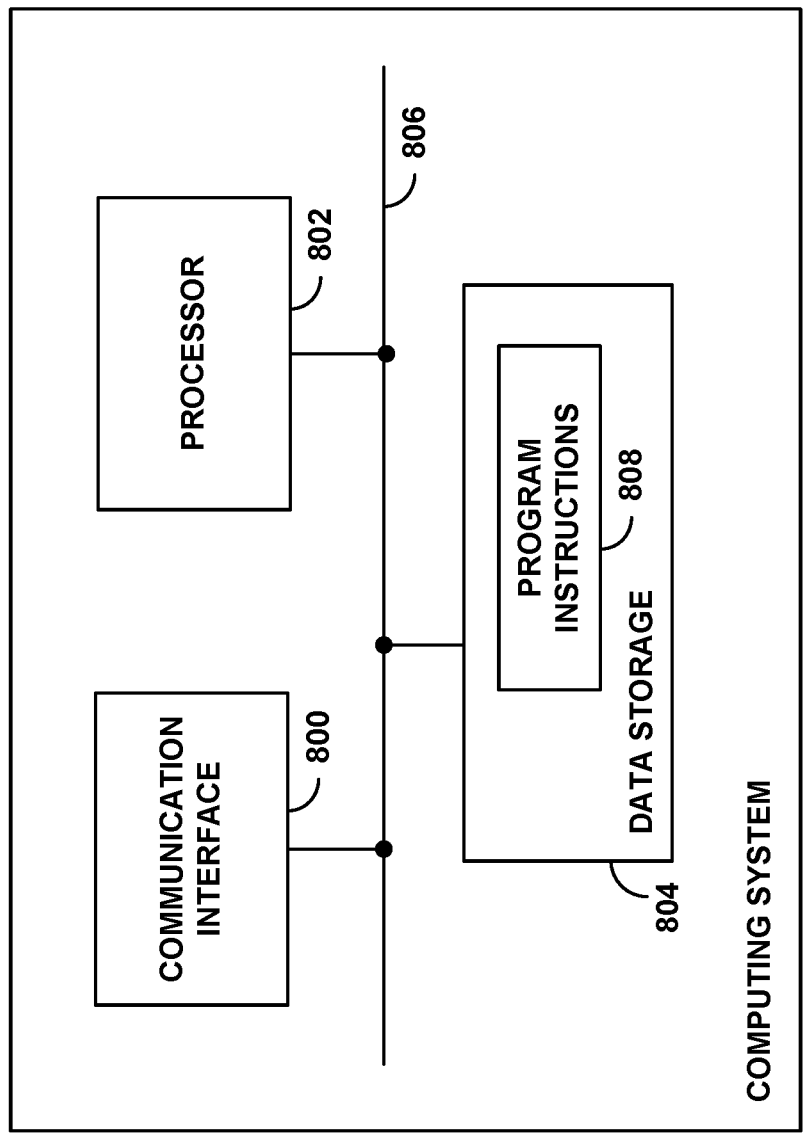
FIG. 8 is a simplified block diagram of an example computing system that could be arranged to operate in accordance with the present disclosure.

FIG. 8 is a simplified block diagram of a computing system that could be configured to operate according to the present disclosure. As shown in FIG. 8, the example computing system includes communication interface 800, a processor 802, and non-transitory data storage 804, any or all of which could be integrated together or, as shown, communicatively linked together by a system bus, network, or other connection mechanism 806.

The communication interface 800 could comprise a physical communication interface and associated logic, enabling the computing system to engage in communication with one or more other local or remote entities. For instance, the network communication interface 1200 could comprise a wireless or wired Ethernet interface or other type of network interface, for engaging in IP communication and/or other type of network communication.

The processor 802 could comprise one or more general purpose processors (e.g., microprocessors) and/or one or more specialized processors (e.g., application specific integrated circuits). And the non-transitory data storage 804 could comprise one or more volatile and/or non-volatile storage components, such as optical, flash, magnetic, RAM, ROM, or other storage, possibly integrated in whole or in part with the processor 802. Further, as shown, the data storage 804 could store stores program instructions 808, which could be executable by the processor 802 to carry out (e.g., cause the computing system to carry out) various operations described herein.

Figure 9:
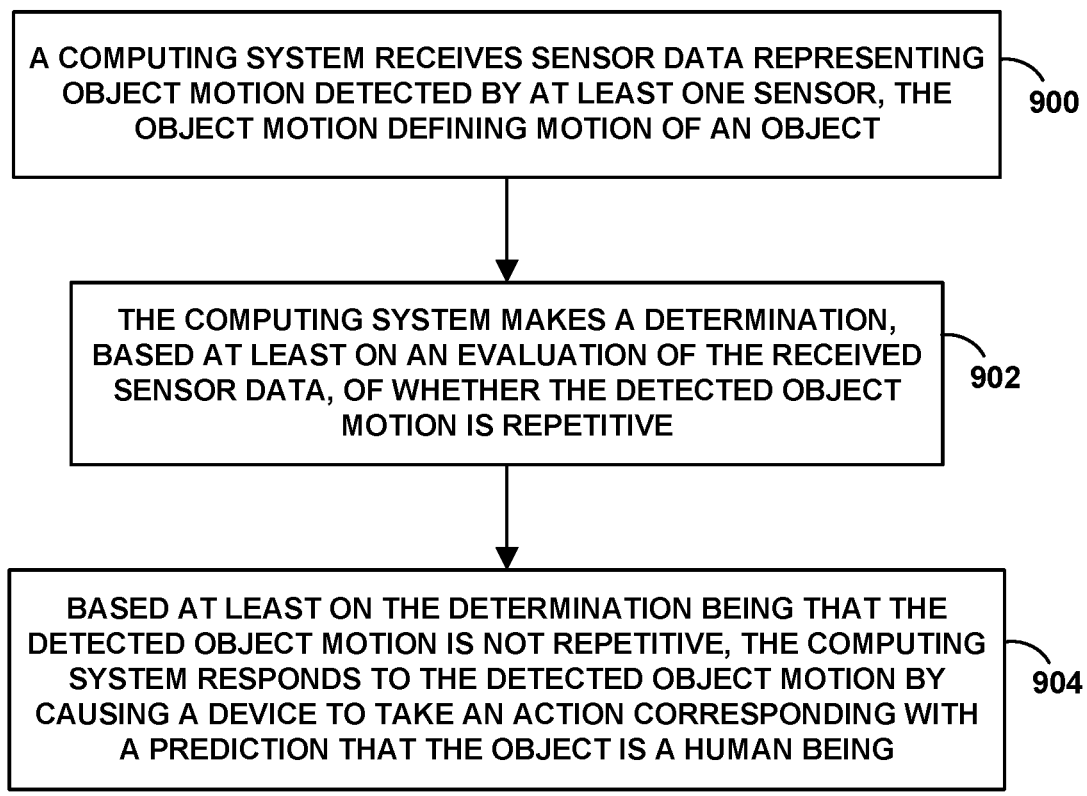
FIG. 9 is a flow chart illustrating an example method operable in accordance with the present disclosure.

FIG. 9 is next a flow chart illustrating an example method that could be carried out in accordance with the present disclosure. This method may be carried out by a computing system such as that discussed above, among other possibilities.

As shown in FIG. 9, at block 900, the example method includes the computing system receiving sensor data representing object motion detected by at least one sensor, the object motion defining motion of an object. At block 902, the method further includes the computing system making a determination, based at least on an evaluation of the received sensor data, of whether the detected object motion is repetitive. And at block 904, the method includes, based at least on the determination being that the detected object motion is not repetitive, responding, by the computing system, to the detected object motion by causing a device to take an action corresponding with a prediction that the object is a human being.

In line with the discussion above, the action corresponding with the prediction that the object is a human being could involve powering on the device. Further, the device could be a media presentation device such as a television, and the action corresponding with the prediction that the object is a human being could involve presenting media content, such as content that may be of interest to a human being.

As further discussed above, the act of making the determination of whether the detected object motion is repetitive could involve determining whether the detected object motion is currently repeating and/or determining whether the detected object motion is a repetition of previously detected object motion. Further, the act could involve determining whether the detected object motion has a repeated path of motion with a repeated speed of motion. And the act could involve determining whether the detected motion repeats periodically.

Further, as discussed above, the at least one sensor and the computing system could be components of the device. For instance, a television may include both a sensor for detecting object motion and a computing system for evaluating that object motion as a basis to classify the object motion as human or rather non-human, so as to facilitate controlling whether to trigger action by the television such as turning on and/or presenting certain media content.

A television having one or more integrated sensors (e.g., millimeter-wave radar sensors) or other such sensors (e.g., in a bezel of the television, behind the display screen of the television, and/or elsewhere in or about the television) could also prove useful as part of a security system.

A television would typically face an area where people may be present in a home. Therefore, a sensor integrated with the television could be conveniently positioned, oriented, and configured to help detect presence of people in that area and thereby to serve as a basis to trigger an alarm or other security-system action. Further, including such a sensor in a television that has a view of an area where people would tend to be present may advance over providing a standalone security-system sensor, as a standalone security-system sensor may not provide as optimal a view of the area as a sensor integrated with the television and may also require cumbersome, separate installation. Still further, as most modern televisions are equipped to have network connectivity (e.g., WiFi and/or other such connectivity), that network connectivity could conveniently facilitate communication between such an integrated security-system sensor and a host security-system server and/or other security-system equipment.

In addition, such a television (e.g., with or without such an integrated security-system sensor) and/or its remote control could usefully provide a security-system user interface, which may help avoid the need for providing other devices for that purpose. For instance, the television display could function to present a security-system alarm or alert, such as a flashing bright color, and/or could function to present security-system configuration interfaces, such as a keypad for arming and disarming the security-system, among other possibilities. Further, the television sound system, e.g., an integrated or connected sound speaker, could function to present alarm sounds, such as a siren or other alert. Still further, the remote control may have a keypad that a user could use to control the security system. Yet further, the remote control and/or television may be configured with a voice user interface (VUI) configured to receive voice input, and a computing system in the television and/or an associated security-system server or other entity may be configured to evaluate voice received through that interface and to use a voiceprint or other characteristic(s) of the received voice as a basis to recognize an authorized user of the security system and responsively arming, disarming, or otherwise configuring the security system, among other possibilities.

A computing system in or associated with a security system in a house or other location may also make use motion detected by a sensor integrated in a television for instance as a basis to detect a potential intrusion and to take associated action. In at least one embodiment, the computing system may interpret motion detected by a sensor as representing a user's gait of walking, breathing pattern, and/or heart rate. Further, the computing system may evaluate motion over time, e.g., when the security system is not armed and/or is armed to stay, to detect, identify, and store an indication of motion that is typical in the house, i.e., motion that tends to happen in the house, such as motion representing the gait, breathing pattern, and/or heart rate of individuals who are regularly in the house. When the security system is armed, the computing system may then detect aberrant motion, i.e., motion that the computing system deems to be different enough from the typical motion to be of note, which may suggest that there has been an intrusion or other issue in the house. For instance, this aberrant motion might be aberrant motion that the computing system deems to represent a gait of walking, a breathing pattern, and/or a heart rate that is not typically present in the house. And in response to detecting that aberrant motion or another aberrant event, the computing system may then trigger security-system action of various types.

For example, in response to detecting an unknown individual in the home and an elevated heartrate of a known individual, the computing system may perform an action. In at least one embodiment, the action can include enabling a microphone in the home and triggering an analysis by the computer system in an effort to identify verbal cues of a crime occurring. In another embodiment, the action may include collecting information from other devices in the home such as security cameras (e.g., to help identify unknown cars in driveway). In some embodiment when the computer system determines that a crime is in progress based on either the information collected from the sensor and/or other devices, the computer system can trigger an action such as notifying the police department.

In another example, in response to detecting the aberrant motion or event, the computing system may trigger scanning airwaves in the house in search of cell phones that are not expected, which may be cell phones of intruders. To facilitate this, the computing system may be provisioned in advance with data indicating the Media Access Control (MAC) addresses of cell phones that tend to be in the house, e.g., self-provisioning itself in advance with this data based on WiFi-device WiFi-equipped device) scanning and reading of the MAC addresses of WiFi packets are transmitted in the house and that have threshold signal strength to indicate that they come from transmission within the house. In response to detecting aberrant motion in the house, the computing system may then signal to a WiFi device to cause the device to report MAC addresses in threshold strong WiFi packets, and the computing system may detect that such a reported MAC address is not one that tends to be transmitted in the house, thus possibly indicating that an intruder with a device having that MAC address is present, and the computing system may respond to this by triggering a security-system alarm or other action. Similar functionality could be carried out using Bluetooth or other protocols as well.

As another example, in response to detecting the aberrant motion or event, the computing system may trigger monitoring for aberrant breathing patterns and/or heart rate in the house. A suitably-equipped millimeter-wave sensor (e.g., a 60 GHz Doppler radar sensor, among other possibilities) in a television or elsewhere could operate to monitor characteristics that an computing system could use as a basis to determine breathing patterns and/or heart rate. As noted above, the computing system may record the breathing patterns and/or heart rate that are typical in the house, e.g., when the security-system is armed. And, in response to detecting of aberrant motion, the computing system may then evaluate whether a present breathing pattern and/or heart rate is an aberration, which may indicate the presence of an intruder, and the computing system may respond to this by triggering a security-system alarm or other action.

Still further, a computing system may respond to detecting of aberrant motion or event in the house by triggering other security-system action. For instance, as noted above, the computing system may responsively trigger use of one or more other sensors to monitor for signs of an intrusion, such as to monitor for presence of a vehicle in a driveway or other associated area, to monitor for presence of audio such as anxious dog barking or the like that may indicate presence of an intruder, among other possibilities. Further, the computing system may respond to detecting of aberrant motion by increasing the sensitivity of one or more security-system sensors, to make the one or more sensors more sensitive to one or more factors that could suggest presence of an intruder and/or could otherwise trigger a security-system alert.

Thus, in the method of FIG. 9, the at least one sensor could include a sensor that is integrated with a television, and the method could additionally include (i) detecting, using the sensor, aberrant motion in an area that the television faces and (ii) triggering security-system operation in response to the detecting of the aberrant motion in the area that the television faces, among other possibilities.

Figure 10:
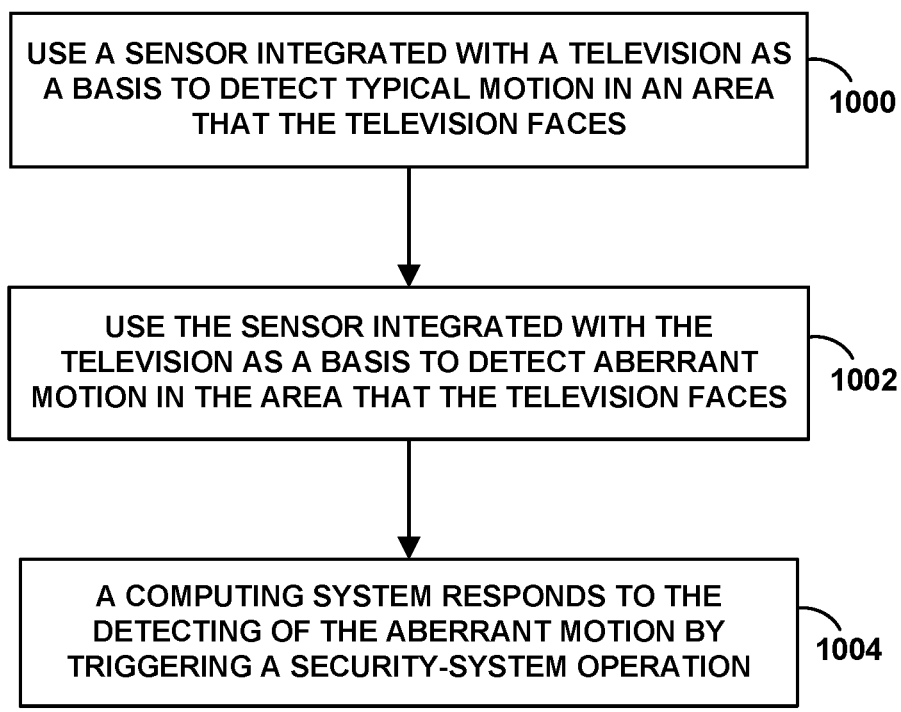
FIG. 10 is another flow chart illustrating an example method operable in accordance with the present disclosure.

FIG. 10 is a flow chart illustrating an example method that could be carried out to facilitate use of a sensor (e.g., millimeter-wave sensor) integrated in a television in connection with a security system. As shown in FIG. 10, at block 1000, the method includes using a sensor integrated with a television as a basis to detect typical motion in an area that the television faces. At block 1002, the method then includes using the sensor integrated with the television as a basis to detect aberrant motion in the area that the television faces, e.g., detecting motion based on the motion being inconsistent with the detected typical motion. Further, at block 1004, the method includes a computing system responding to the detecting of the aberrant motion by triggering a security-system operation, such as any of those noted above among other possibilities.

Figure 11:
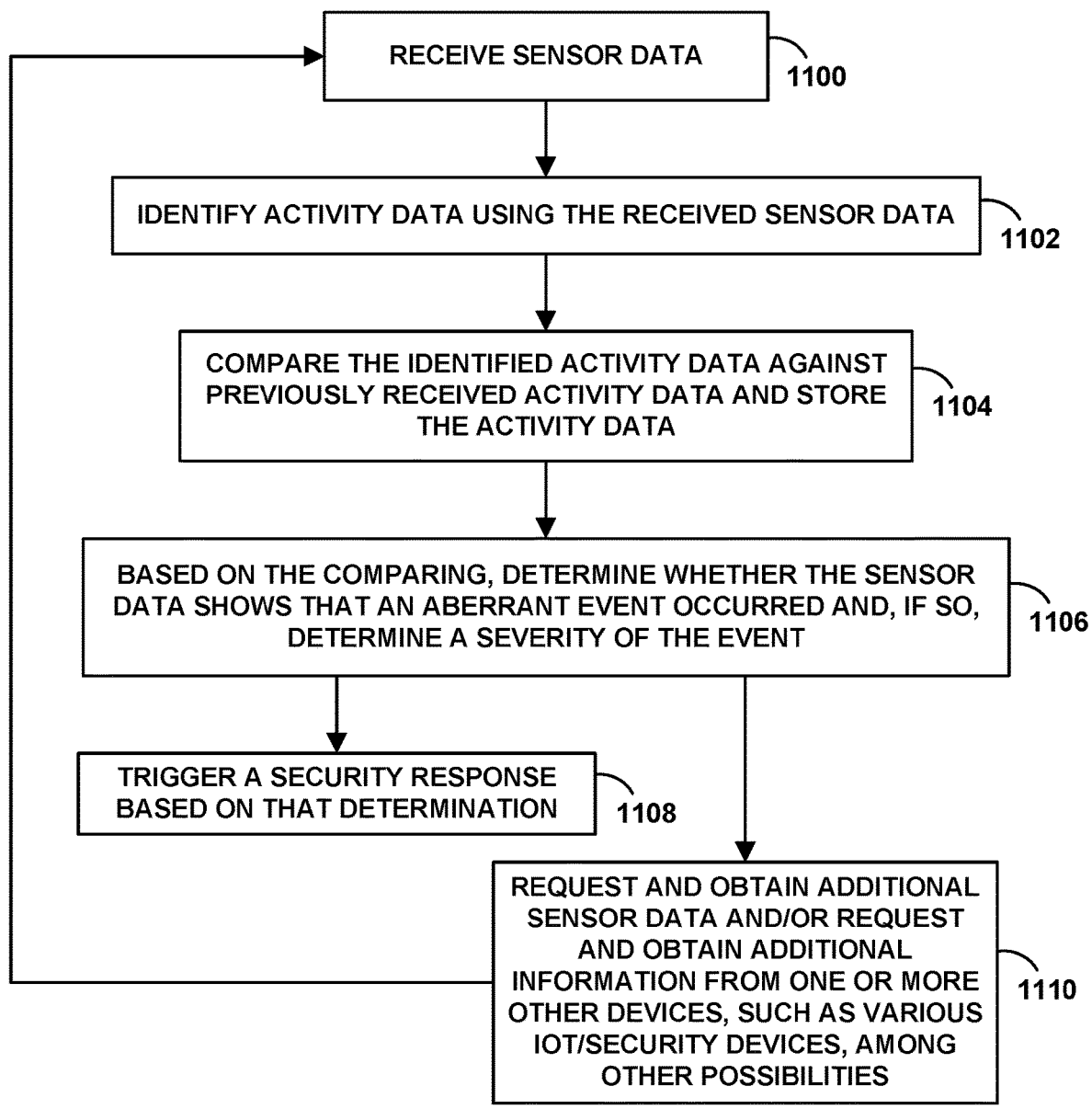
FIG. 11 is another flow chart illustrating an example method operable in accordance with the present disclosure.

FIG. 11 is a flow chart illustrating another example method that could be carried out in accordance with the present disclosure. As shown in FIG. 1, at block 1100, a computing system could receive sensor data. At block 1102, the computing system could identify activity data (e.g., gait, breathing pattern, heart rate, or other motion or sounds, among other possibilities) using the received sensor data. At block 1104, the computing system could compare the identified activity data against previously received activity data and could store the activity data. At block 1106, based on the comparing, the computing system could determine whether the sensor data shows that an aberrant event occurred and could determine a severity of the event. At block 1108, the computing system could trigger a security response based on that determination. Further, at block 1110, the computing system could request and obtain additional sensor data (and could continue the process again at block 1100) and/or could request and obtain additional information from one or more other devices, such as various IoT/security devices, among other possibilities.

Further, the present disclosure also contemplates one or more non-transitory computer-readable media encoded with, storing, or otherwise embodying program instructions executable by at least one processor of a computing system to cause the computing system to carry out various operations as described herein.

Exemplary embodiments have been described above. Those skilled in the art will understand, however, that changes and modifications may be made to these embodiments without departing from the true scope and spirit of the invention.

We claim:

1. A method comprising:
   determining, by a computing system, based on past instances of detected object motion in correlation with timing of when a device gets turned on, that the device gets turned on upon detected object motion stopping at or around a particular position;
   based on the determining, the computing system configuring itself to automatically turn on the device in response to the computing system detecting object motion stopping at or around the particular position;
   after the configuring, (i) receiving, by the computing system, sensor data representing object motion detected by at least one sensor, wherein the object motion detected by the at least one sensor defines motion of an object, (ii) making a determination, by the computing system, based at least on an evaluation of the received sensor data, of whether the object motion detected by the at least one sensor is repetitive, and (iii) based at least on the determination being that the object motion detected by the at least one sensor is repetitive, forgoing, by the computing system, the automatically turning on of the device even if the object motion detected by the at least one sensor stops at or around the particular position.

2. The method of claim 1, wherein the forgoing of the automatically turning on of the device based at least on the determination being that the object motion detected by the at least one sensor is repetitive comprises abandoning tracking of motion of the object.

3. The method of claim 1, wherein the device comprises a light.

4. The method of claim 3, wherein the device comprises a television.

5. The method of claim 1, wherein making the determination of whether the object motion detected by the at least one sensor is repetitive comprises an operation selected from the group consisting of (i) determining whether the object motion detected by the at least one sensor is currently repeating and (ii) determining whether the object motion detected by the at least one sensor is a repetition of previously detected object motion.

6. The method of claim 5, wherein making the determination of whether the object motion detected by the at least one sensor is repetitive comprises determining whether the object motion detected by the at least one sensor has a repeated path of motion with a repeated speed of motion.

7. The method of claim 5, wherein making the determination of whether the object motion detected by the at least one sensor is repetitive comprises determining whether the object motion detected by the at least one sensor repeats periodically.

8. The method of claim 1, wherein the at least one sensor and the computing system are components of the device.

9. The method of claim 1, wherein the at least one sensor comprises a sensor integrated with a television, and wherein the method further comprises:
   detecting, using the sensor, aberrant motion in an area that the television faces; and
   triggering security-system operation in response to the detecting of the aberrant motion in the area that the television faces.

10. A computing system comprising:
   at least one processor;
   non-transitory data storage;
   program instructions stored in the non-transitory data storage and executable by the at least one processor to carry out operations including:
      determining, based on past instances of detected object motion in correlation with timing of when a device gets turned on, that the device gets turned on upon detected object motion stopping at or around a particular position,
      based on the determining, configuring the computing system to automatically turn on the device in response to the computing system detecting object motion stopping at or around the particular position, and
      after the configuring, (i) receiving sensor data representing object motion detected by at least one sensor, wherein the object motion detected by the at least one sensor defines motion of an object, (ii) making a determination, based at least on an evaluation of the received sensor data, of whether the object motion detected by the at least one sensor is repetitive, and (iii) based at least on the determination being that the object motion detected by the at least one sensor is repetitive, forgoing the automatically turning on of the device even if the object motion detected by the at least one sensor stops at or around the particular position.

11. The computing system of claim 10, wherein the forgoing of the automatically turning on of the device based at least on the determination being that the object motion detected by the at least one sensor is repetitive comprises abandoning tracking of motion of the object.

12. The computing system of claim 10, wherein the device comprises an item selected from the group consisting of a light and a television.

13. The computing system of claim 10, wherein making the determination of whether the object motion detected by the at least one sensor is repetitive comprises an operation selected from the group consisting of (i) determining whether the object motion detected by the at least one sensor is currently repeating and (ii) determining whether the object motion detected by the at least one sensor is a repetition of previously detected object motion.

14. The computing system of claim 13, wherein making the determination of whether the object motion detected by the at least one sensor is repetitive comprises determining whether the object motion detected by the at least one sensor has a repeated path of motion with a repeated speed of motion.

15. The computing system of claim 13, wherein making the determination of whether the object motion detected by the at least one sensor is repetitive comprises determining whether the object motion detected by the at least one sensor repeats periodically.

16. The computing system of claim 10, wherein the computing system is a component of the device.

17. The computing system of claim 16, wherein the sensor is a component of the device.

18. At least one non-transitory computer-readable medium having stored thereon program instructions executable by at least one processor to carry out operations comprising:

determining, based on past instances of detected object motion in correlation with timing of when a device gets turned on, that the device gets turned on upon detected object motion stopping at or around a particular position;

based on the determining, configuring the computing system to automatically turn on the device in response to the computing system detecting object motion stopping at or around the particular position; and after the configuring, (i) receiving sensor data representing object motion detected by at least one sensor, wherein the object motion detected by the at least one sensor defines motion of an object, (ii) making a determination, based at least on an evaluation of the received sensor data, of whether the object motion detected by the at least one sensor is repetitive, and (iii) based at least on the determination being that the object motion detected by the at least one sensor is net repetitive, forgoing the automatically turning on of the device even if the object motion detected by the at least one sensor stops at or around the particular position.

19. The at least one non-transitory computer-readable medium of claim 18, wherein the forgoing of the automatically turning on of the device based at least on the determination being that the object motion detected by the at least one sensor is repetitive comprises abandoning tracking of motion of the object.

20. The at least one non-transitory computer-readable medium of claim 18, wherein making the determination of whether the object motion detected by the at least one sensor is repetitive comprises an operation selected from the group consisting of (i) determining whether the object motion detected by the at least one sensor is currently repeating and (ii) determining whether the object motion detected by the at least one sensor is a repetition of previously detected object motion.

* * * * *